Aug. 10, 1926.
E. COBURN
1,595,709
SACK CHUTE FOR HARVESTER THRASHERS
Filed Feb. 8, 1926  2 Sheets-Sheet 1
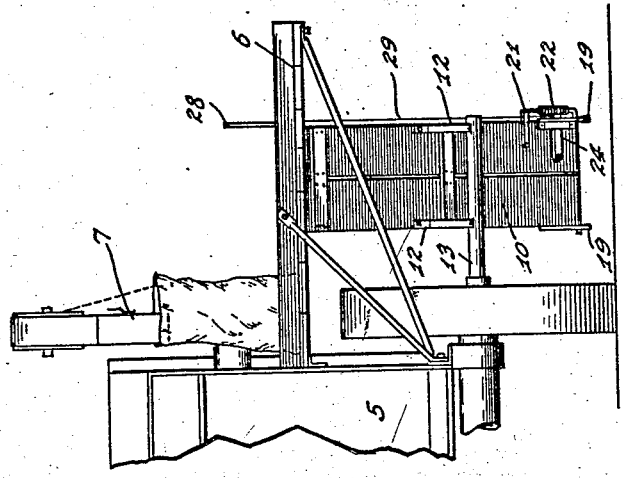
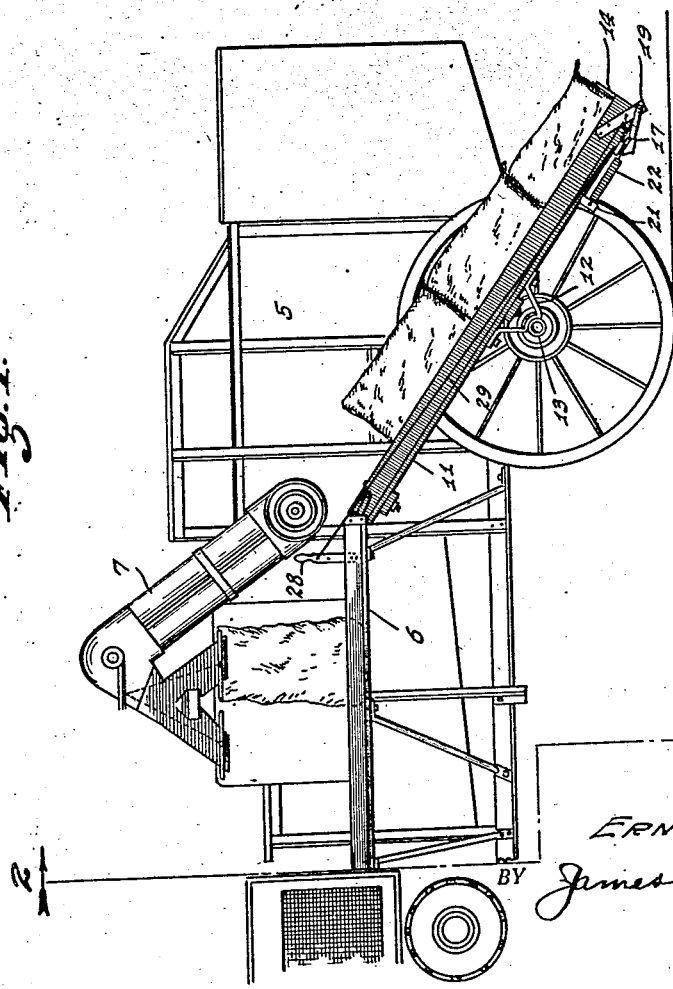
INVENTOR.
ERNEST COBURN,
BY James A. Walsh
ATTORNEY.

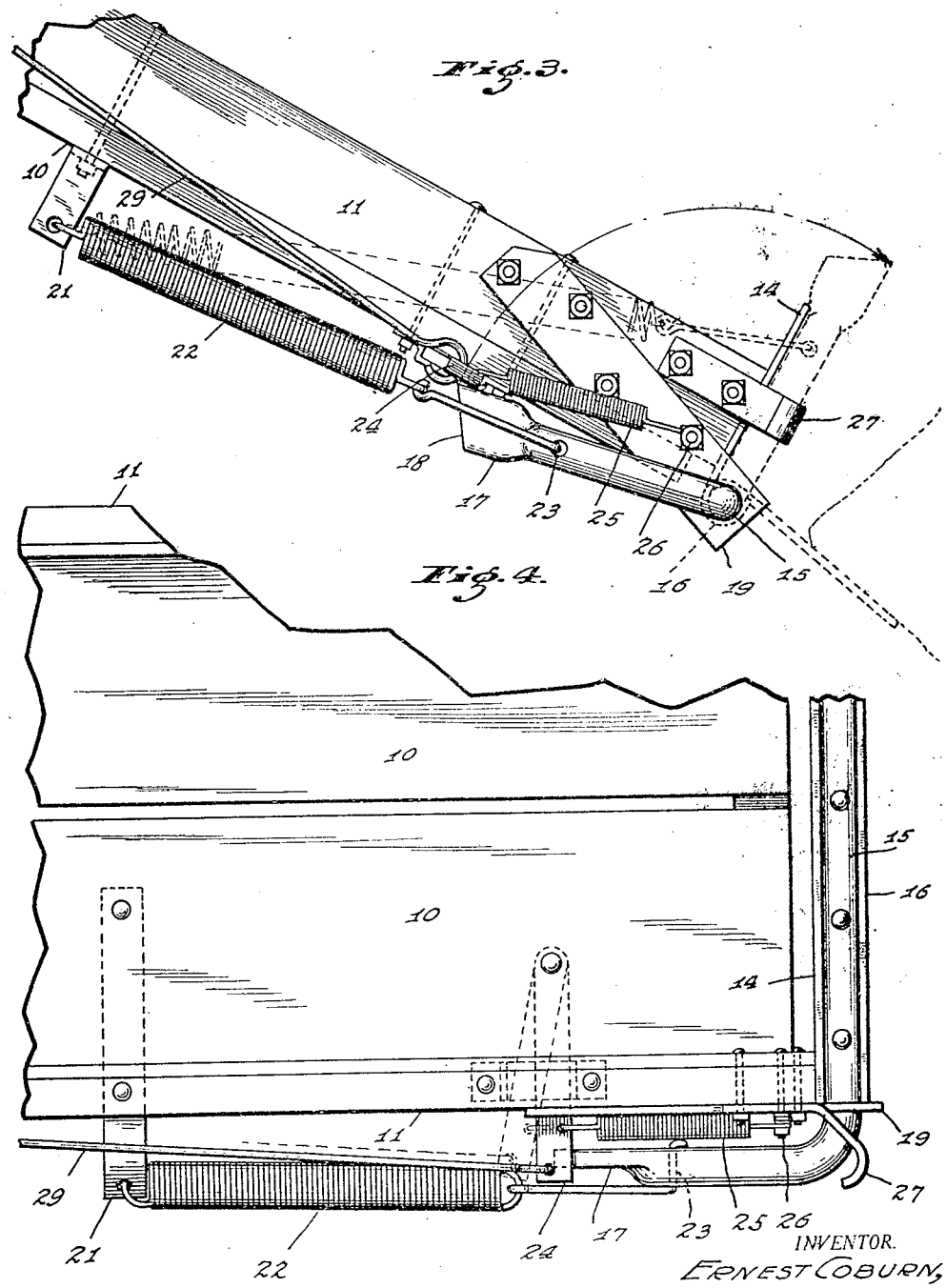

Patented Aug. 10, 1926.

1,595,709

UNITED STATES PATENT OFFICE.

ERNEST COBURN, OF RACINE, WISCONSIN, ASSIGNOR TO J. I. CASE THRESHING MACHINE COMPANY, OF RACINE, WISCONSIN, A CORPORATION.

SACK CHUTE FOR HARVESTER THRASHERS.

Application filed February 8, 1926. Serial No. 86,683.

The object of my invention is to provide an improved chute for delivering sacked grain for combination harvester-thrashers in such manner that as the machinery is moving through the field the thrashed grain as it is being discharged from the thrasher and sacked on a platform of the machine may be conveyed therefrom in continuous groups to be conveniently loaded into wagons or trucks and hauled to desired places of deposit.

In the accompanying drawings, forming part hereof, Figure 1 is a side elevation of a thrasher element of a combination harvester-thrasher with my improved sack chute associated therewith; Fig. 2 a front elevation; and Figs. 3 and 4 details of a portion of my improvement.

My invention is applied to the thrasher element, 5, of the combination machine, and preferably used in connection with a platform, 6, extending from the side of the thrasher at which the thrashed grain is delivered through a sacker elevator or otherwise, 7, into sacks, the open ends of which sacks when filled with grain are sewed by an attendant on the platform. To said platform 6 I hinge or pivotally secure an inclined chute 10 having guards, 11, and a leg or legs, 12 adapted to rest upon a suitable support, as an arm, 13, extending from the axle or other part of the thrasher, and by which support and leg the lower end of the chute may be maintained in the desired position in relation to the ground, while the swinging thereof in any desired vertical direction is permitted through its hinged or pivotal connection to said platform 6, as stated. At the lower end of said chute I provide a tail-gate, 14, which is preferably mounted upon and arranged to swing with a rock-shaft, 15, and which attachment may be accomplished by curving the lower end, 16, of said gate and riveting or otherwise securing the same to said shaft 15, (indicated in Fig. 4) which shaft terminates in a latch, 17, positioned at one side of said gate 14, said latch having a beveled end, 18, for a purpose to appear, the rock-shaft 15 being mounted in bearings, 19, at each side of chute 10. To said chute 10 I secure an anchor, 21, to which is attached a spring, 22, which at its opposite end at 23, is pivotally attached to said latch 17. Intermediate said anchor 21 and rock-shaft 15 I pivotally secure to the chute a keeper, 24, for limiting the movement of latch 17. On platform 6 or other suitable location I mount a lever, 28, to which is secured a rod or rope, 29, extending to and attached to keeper 24.

In operation, it will be understood that the machine is moving through the field cutting and thrashing grain, which grain is conveyed from the thrasher through the sacker elevator 7 and discharged into sacks, which, as they are filled and sewed, are placed on the chute 10 and by gravity slide to the lower end thereof. As the lower sack reaches tail-gate 14 the attendant upon the platform by manipulating lever 28 pulls keeper 24 off latch 17, whereupon the pressure of the sack as it moves downwardly against said tail-gate is sufficient to open said gate to the position indicated by dotted lines in Fig. 3, and passes out thereover to the ground, while the closely following oncoming sacks maintain the gate in open position and follow the same course, the gate being limited in its downwardly inclined position by means of stop 27, which checks the throw of latch 17. In the situation described spring 22, secured to anchor 21 and pivotally connected to latch 7, follows the latter in its upward movement through pressure of the sacks upon tail-gate 14, as indicated by dotted lines in Fig. 3, and as a single or the last sack of a group has passed through the gateway said spring contracts to normal condition, as shown in full lines in said Fig. 3, at the same time pulling latch 17 downwardly and which movement is aided by the inertia of the moving parts, thus closing said gate, and when the beveled end of said latch contacts with keeper 24 it throws the latter away from the latch so that said latch passes beneath the keeper, and by reason of tension spring 25 said keeper is returned to normal position, as indicated in Fig. 4, so that it lies across the latch to prevent the same from displacement, and thus maintaining the tail-gate 14 in closed position until the keeper is tripped through the rod 29 as described. In this manner I provide a chute which is sustained from the ground, and the tail-gate of which is automatically opened by the action of the moving sacks, and closed by the devices described. The chute is highly practical in connection with a traveling harvester-thrasher as I have demonstrated in actual practice in the fields, and the efficiency of which is increased for delivering sacked grain by the vibrations incident to the travel and operation of such machinery over ground irregularities which are present in field operations; and by the employment of a platform in the manner stated an attendant thereon may conveniently handle and sew such sacks and readily push or tumble them onto the chute to be deposited on the ground.

I claim as my invention:

1. The combination, with a thrasher, of a platform, a chute connected thereto, a tail-gate at the lower end of said chute, means for mounting said gate thereon, means on said chute for maintaining said gate in closed position, yielding means connecting said chute and gate, and means for releasing said maintaining means to permit said gate to be opened by the weight of moving sacks and returned to closed position by said yielding means.

2. The combination, with a thrasher, of a chute, a gate at its lower end, means connected to said chute upon which said gate is mounted to permit the swinging thereof, a latch on said means, a keeper on said chute with which said latch engages, and means connecting said keeper and under the control of an operator for disengaging said latch therefrom to permit the opening of said gate.

3. In a sack delivering chute, a pivotally mounted tail-gate, a latch associated therewith, means for engaging said latch to maintain said gate in closed position, means for releasing said engaging means to permit the opening of said gate, and yielding means connecting said chute and latch for returning said gate to closed position.

4. In a sack delivering chute, a tail-gate, means for supporting said gate, a latch associated with said gate, means engaging said latch for maintaining said gate in closed position, means for releasing said engaging means to permit the opening of said gate by pressure, means for returning said engaging means to normal position, and means connecting said chute and gate for closing the latter.

5. In a sack delivering chute, means for supporting the same upon a thrasher, a tail-gate at the end of said chute, means for hingedly connecting said chute and gate, a latch associated with said gate, means for limiting the movement of said latch, means for engaging said latch to maintain said gate in closed position, means for disengaging said engaging means from said latch to permit the opening of said gate, and yielding means for returning said gate to closed position.

6. In a sack delivering chute for a thrasher, a pintle mounted thereon and terminating in a latch, a gate on said pintle, a spring connecting said chute and latch, a keeper on said chute for engaging said latch, a spring for controlling the movement of said keeper, and means for disengaging said keeper from said latch to permit the opening of said gate.

7. The combination, with a thrasher, of an inclined chute, supporting means on said thrasher, means on said chute adapted to rest upon said supporting means for sustaining the chute, a gate yieldingly mounted upon the lower end of said chute, means for maintaining said gate in closed position, means for releasing said gate to permit the opening and outward swinging thereof by pressure from the weight of moving sacks, and means for returning said gate to closed position.

In testimony whereof I affix my signature.

ERNEST COBURN.